(12) United States Patent
Hendry et al.

(10) Patent No.: US 11,652,985 B2
(45) Date of Patent: May 16, 2023

(54) SUPPORT OF ADAPTIVE RESOLUTION CHANGE IN VIDEO CODING

(71) Applicant: Huawei Technologies Co., Ltd., Shenzhen (CN)

(72) Inventors: Fnu Hendry, San Diego, CA (US); Ye-Kui Wang, San Diego, CA (US); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 11 days.

(21) Appl. No.: 17/360,960

(22) Filed: Jun. 28, 2021

(65) Prior Publication Data

US 2021/0329226 A1 Oct. 21, 2021

Related U.S. Application Data

(63) Continuation of application No. PCT/US2019/068777, filed on Dec. 27, 2019.
(Continued)

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11); *H04N 19/172* (2014.11); *H04N 19/30* (2014.11)

(58) Field of Classification Search
None
See application file for complete search history.

(56) References Cited

U.S. PATENT DOCUMENTS

2006/0233259 A1 10/2006 Chou et al.
2008/0137731 A1 6/2008 Sekiguchi et al.
(Continued)

FOREIGN PATENT DOCUMENTS

CN 105556965 A 5/2016
CN 106961609 A 7/2017
(Continued)

OTHER PUBLICATIONS

Davies, "Resolution switching for coding efficiency and resilience", Joint Collaborative Team Coding (JCT-VC) of ITU-T SG16 WP3 and ISO/IEC JTC1/SC29/WG11, 6th Meeting: Turing, IT, Jul. 14-22, 2011, JCTVC-F158 (Year: 2011).*
(Continued)

*Primary Examiner* — Stuart D Bennett
(74) *Attorney, Agent, or Firm* — Conley Rose, P.C.

(57) ABSTRACT

A video coding mechanism is disclosed. The mechanism includes receiving a bitstream including a plurality of picture parameter sets (PPSs) and a plurality of pictures at a plurality of picture sizes. A first picture size of a first picture is determined from a first PPS. The first picture is decoded at the first picture size to create a decoded reference picture. The decoded reference picture is stored in a decoded picture buffer. A second picture size of a second picture is determined from a second PPS. The second picture references the decoded reference picture according to inter-prediction. The decoded reference picture is scaled from the first picture size to the second picture size. The second picture is decoded at the second picture size based on the decoded reference picture at the second picture size.

17 Claims, 9 Drawing Sheets

Related U.S. Application Data

(60) Provisional application No. 62/787,104, filed on Dec. 31, 2018.

(51) Int. Cl.
  *H04N 19/159* (2014.01)
  *H04N 19/172* (2014.01)
  *H04N 19/30* (2014.01)

(56) References Cited

U.S. PATENT DOCUMENTS

| | | | |
|---|---|---|---|
| 2013/0089154 | A1 | 4/2013 | Chen et al. |
| 2013/0094773 | A1 | 4/2013 | Misra et al. |
| 2013/0182755 | A1 | 7/2013 | Chen et al. |
| 2013/0188882 | A1 | 7/2013 | Zhao et al. |
| 2014/0219346 | A1 | 8/2014 | Ugur et al. |
| 2016/0191926 | A1 | 6/2016 | Deshpande et al. |
| 2016/0191931 | A1 | 6/2016 | Hannuksela |
| 2016/0261872 | A1 | 9/2016 | Wang et al. |
| 2016/0381385 | A1 | 12/2016 | Ugur |
| 2017/0180737 | A1* | 6/2017 | Ye .................. H04N 19/82 |
| 2017/0201751 | A1 | 7/2017 | Seo |
| 2017/0219346 | A1* | 8/2017 | Askarpour .......... G01C 19/36 |
| 2018/0278940 | A1 | 9/2018 | Park et al. |
| 2020/0374552 | A1* | 11/2020 | Skupin ............. H04N 19/124 |

FOREIGN PATENT DOCUMENTS

| | | |
|---|---|---|
| CN | 107431819 A | 12/2017 |
| EP | 3355581 A1 | 8/2018 |
| JP | 2003125407 A | 4/2003 |
| WO | 2017162911 A1 | 9/2017 |
| WO | 2021026368 A1 | 2/2021 |
| WO | 2021034579 A1 | 2/2021 |

OTHER PUBLICATIONS

Hendry et. al., "On adaptive resolution change (ARC) for VVC" Joint Video Expert Team (JVET) of ITU-T SG16 WP3 and ISO/IEC JTC 1/SC29/WG 11, 13th Meeting: Marrakech, MA, Jan. 9-18, 2019, JVET-M0135-v1 (Year: 2019).*

Bross, et al., "Versatile Video Coding (Draft 3)," Joint Video Experts Team (JVET) of ITU-T SG 16 WP 3 and ISO/IEC JTC 1/SC 29/WG 11, 12th Meeting: Macao, CN, Oct. 3-12, 2018, Document JVET-L1001 v7, 226 pages.

"Line Transmission of Non-Telephone Signals, Video Codec for Audiovisual Services at p x 64 kbits," ITU-T Recommendation H.261, Mar. 3, 1993, 29 pages.

"Video Coding for Low Bit Rate Communication," Series H: Auddiovisual and Multimedia Systems Infrastructure of Audiovisual Services—Coding of Moving Video, ITU-T H.263, Jan. 2005, 226 pages.

"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.

Aboba, Ed., et al., Scalable Video Coding (SVC) Extension for WebRTC, W3C Working Draft Mar. 15, 2021, https://www.w3.org/TR/2021/WD-webrtc-svc-202103 15/, 29 pages.

"High Efficiency Video Coding," Series H: Audiovisual and Multimedia Systems Infrastructure of Audiovisual Services—Coding of Moving Video, ITU-T H.265, Dec. 2016, 664 pages.

"Line Transmission of Non-Telephone Signals, Video Codec for Audiovisual Services at p x 64 kbits," ITU-T, H.261, Mar. 1993, 29 pages.

"Transmission of Non-Telephone Signals, Information Technology— Generic Coding of Moving Pictures and Associated Audio Information: Video," H.262, Jul. 1995, 211 pages.

"Series H: Audiovisual and Multimedia Systems, Infrastructure of audiovisual services—Coding of moving video, Video coding for low bit rate communication," ITU-T, H.263, Jan. 2005, 226 pages.

"Series H: Audiovisual and Multimedia Systems, Infrastructure of audiovisual services—Coding of moving video, Advanced video coding for generic audiovisual services," ITU-T, H.264, Jun. 2019, 836 pages.

"Series H: Audiovisual and Multimedia Systesm, Infrastructure of audiovisual services—Coding of moving video, High efficiency video coding," H.265, Apr. 2013, 317 pages.

Bross, B., et al., "Versatile Video Coding (Draft 3)," JVET-L1001-v3, Oct. 3-12, 2018, 181 pages.

"Information technology—Coding of audio-visual objects—Part 12: ISO base media file format," ISO/IEC 14496-12, Fifth Edition, Dec. 15, 2015, 248 pages.

"Information technology—Coding of audio-visual objects—Part 14: MP4 file format," ISO/IEC 14496-14, Second Edition, Nov. 2018, 22 pages.

"Information technology—Coding of audio-visual objects—Part 15: Advanced Video Coding (AVC) file format," ISO/IEC 14496-15, First Edition, Apr. 15, 2004, 29 pages.

Document: JCTVC-N0121 and JCT3V-E0107, Choi, B., et al., "MV-HEVC/SHVC HLS: Random access of multiple layers," Joint Collaborative Team on Video Coding (JCT-VC) of ITU-T SG 16 WP 3 and ISO/IEC JTC 1/SC 29/WG11, 14th Meeting: Vienna, AT, Jul. 25-Aug. 2, 2013, and Joint Collaborative Team on 3D Video Coding Extensions of ITU-T SG 16 WP 3 and ISO/IEC JTC 1/SC 29/WG11, 5th Meeting: Vienna, AT, Jul. 27-Aug. 2, 2013, 4 pages.

* cited by examiner

SUPPORT OF ADAPTIVE RESOLUTION CHANGE IN VIDEO CODING

CROSS-REFERENCE TO RELATED APPLICATIONS

This patent application is a continuation of International Application No. PCT/US2019/068777, filed Dec. 27, 2019 by FNU Hendry, et. al., and titled "Support of Adaptive Resolution Change in Video Coding," which claims the benefit of U.S. Provisional Patent Application No. 62/787,104, filed Dec. 31, 2018 by FNU Hendry, et. al., and titled "Support of Adaptive Resolution Change in Video Coding," which is hereby incorporated by reference.

TECHNICAL FIELD

The present disclosure is generally related to video coding, and is specifically related to adaptive resolution change (ARC) mechanisms to support increased compression in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in a decoder, the method comprising: receiving, by a receiver of the decoder, a bitstream including a plurality of picture parameter sets (PPSs) and a plurality of pictures at a plurality of picture sizes; determining, by a processor of the decoder, a first picture size of a first picture from a first PPS; decoding, by the processor, the first picture at the first picture size to create a decoded reference picture; storing, by a memory of the decoder, the decoded reference picture in a decoded picture buffer; determining, by a processor of the decoder, a second picture size of a second picture from a second PPS, wherein the second picture references the decoded reference picture according to inter-prediction; scaling, by the processor, the decoded reference picture from the first picture size to the second picture size; and decoding, by the processor, the second picture at the second picture size based on the decoded reference picture at the second picture size. Video streams may dynamically change resolutions. Some systems change resolutions by employing an intra-coded, known as an intra random access point (IRAP) picture, which breaks all inter-prediction. The IRAP picture may clear the decoded picture buffer. For example, the IRAP picture is coded by causing blocks in the IRAP picture to reference other blocks in the same picture and without referencing other pictures. Such an IRAP picture is significantly larger from a data standpoint, and hence less coding efficient than an inter-coded picture. Further, inter-coded pictures that follow the IRAP picture may not reference pictures that precede the IRAP picture. Accordingly, coding efficiency may be reduced for inter-coded pictures until the decoded picture buffer is refilled. In some applications, resolution changes may occur in response to changes in network conditions. For example, a lower resolution video segment may be requested when network communication speed slows due to congestion. Accordingly, the IRAP picture may decrease coding efficiency at exactly the instant that coding efficiency should be increased to overcome such network congestion. The present disclosure includes a mechanism to change resolutions without employing an IRAP picture. This approach avoids sending an extra IRAP picture and avoids breaking inter-prediction. Accordingly, the disclosed mechanism increases coding efficiency, and hence reduces memory, processor, and/or network resource usage at an encoder and/or at a decoder. The disclosed mechanism stores each decoded reference picture at a corresponding decoded size (e.g., a first size) in a picture buffer. In the event of a resolution change, the decoded reference picture may be resized by a scaling process. For example, a second picture at a second size may be received. The decoded reference picture is then resized from the first size to the second size. As the sizes of the two pictures are the same, inter-prediction may continue without interruption. This avoids sending an extra IRAP picture and avoids refreshing the decoded picture buffer and thereby breaking inter-prediction chains. As such, the disclosed mechanism sends fewer bits during a resolution change than other mechanisms that employ an IRAP picture to initiate a resolution change.

Optionally, in any of the preceding aspects, another implementation of the aspect provides, wherein the first picture and the second picture are not separated in the bitstream by an IRAP picture.

Optionally, in any of the preceding aspects, another implementation of the aspect provides, wherein the decoded reference picture is not scaled until the decoded reference picture is referenced by the second picture.

Optionally, in any of the preceding aspects, another implementation of the aspect provides, wherein the decoded reference picture is stored in a temporary buffer after scaling.

Optionally, in any of the preceding aspects, another implementation of the aspect provides, wherein the first picture size is different from the second picture size.

Optionally, in any of the preceding aspects, another implementation of the aspect provides, further comprising forwarding, by the processor, the first picture and the second picture for display as part of a decoded video sequence.

Optionally, in any of the preceding aspects, another implementation of the aspect provides, wherein the memory maintains a single version of the decoded reference picture despite scaling.

Optionally, in any of the preceding aspects, another implementation of the aspect provides, wherein the first picture size and the second picture size are indicated in the bitstream in units of luma samples.

In an embodiment, the disclosure includes a method implemented in an encoder, the method comprising: encoding, by a processor of the encoder, a first picture in a bitstream at a first picture size; decoding, by the processor, the first picture at the first picture size to create a decoded reference picture; storing, by a memory of the encoder, the decoded reference picture in a decoded picture buffer; determining, by the processor, to encode a second picture at a second picture size, wherein the second picture references the decoded reference picture; scaling, by the processor, the decoded reference picture from the first picture size to the second picture size; encoding, by the processor, the second picture in the bitstream at the second picture size based on the decoded reference picture at the second picture size; indicating the first picture size in a first PPS associated with the first picture and the second picture size in a second PPS associated with the second picture; and storing, in the memory, the bitstream for communication toward a decoder. Some systems change resolutions by employing an intra-coded, known as an IRAP picture, which breaks all inter-prediction. The IRAP picture may clear the decoded picture buffer. For example, the IRAP picture is coded by causing blocks in the IRAP picture to reference other blocks in the same picture and without referencing other pictures. Such an IRAP picture is significantly larger from a data standpoint, and hence less coding efficient than an inter-coded picture. Further, inter-coded pictures that follow the IRAP picture may not reference pictures that precede the IRAP picture. Accordingly, coding efficiency may be reduced for inter-coded pictures until the decoded picture buffer is refilled. In some applications, resolution changes may occur in response to changes in network conditions. For example, a lower resolution video segment may be requested when network communication speed slows due to congestion. Accordingly, the IRAP picture may decrease coding efficiency at exactly the instant that coding efficiency should be increased to overcome such network congestion. The present disclosure includes a mechanism to change resolutions without employing an IRAP picture. This approach avoids sending an extra IRAP picture and avoids breaking inter-prediction. Accordingly, the disclosed mechanism increases coding efficiency, and hence reduces memory, processor, and/or network resource usage at an encoder and/or at a decoder. The disclosed mechanism stores each decoded reference picture at a corresponding decoded size (e.g., a first size) in a picture buffer. In the event of a resolution change, the decoded reference picture may be resized by a scaling process. For example, a second picture at a second size may be received. The decoded reference picture is then resized from the first size to the second size. As the sizes of the two pictures are the same, inter-prediction may continue without interruption. This avoids sending an extra IRAP picture and avoids refreshing the decoded picture buffer and thereby breaking inter-prediction chains. As such, the disclosed mechanism sends fewer bits during a resolution change than other mechanisms that employ an IRAP picture to initiate a resolution change.

Optionally, in any of the preceding aspects, another implementation of the aspect provides, wherein the first picture and the second picture are not separated in the bitstream by an IRAP picture.

Optionally, in any of the preceding aspects, another implementation of the aspect provides, wherein the decoded reference picture is not scaled until the decoded reference picture is referenced by the second picture.

Optionally, in any of the preceding aspects, another implementation of the aspect provides, wherein the decoded reference picture is stored in a temporary buffer after scaling.

Optionally, in any of the preceding aspects, another implementation of the aspect provides, wherein the first picture size is different from the second picture size.

Optionally, in any of the preceding aspects, another implementation of the aspect provides, wherein the memory maintains a single version of the decoded reference picture despite scaling.

Optionally, in any of the preceding aspects, another implementation of the aspect provides, wherein the first picture size and the second picture size are indicated in the bitstream in units of luma samples.

In an embodiment, the disclosure includes a video coding device comprising: a processor, a receiver coupled to the processor, and a transmitter coupled to the processor, the processor, receiver, and transmitter configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising: a receiving means for receiving a bitstream including a plurality of PPSs and a plurality of pictures at a plurality of picture sizes; a first determining means for determining a first picture size of a first picture from a first PPS; a first decoding means for decoding the first picture at the first picture size to create a decoded reference picture; a storing means for storing the decoded reference picture in a decoded picture buffer; a second determining means for determining a second picture size of a second picture from a second PPS, wherein the second picture references the decoded reference picture according to inter-prediction; a scaling means for scaling the decoded reference picture from the first picture size to the second picture size; and a second decoding means for decoding the second picture at the second picture size based on the decoded reference picture at the second picture size.

Optionally, in any of the preceding aspects, another implementation of the aspect provides, wherein the decoder is further configured to perform the method of any of the preceding aspects.

In an embodiment, the disclosure includes an encoder comprising: a first encoding means for encoding a first picture in a bitstream at a first picture size; a decoding means for decoding the first picture at the first picture size to create a decoded reference picture; a first storing means for storing the decoded reference picture in a decoded picture buffer; a determining means for determining to encode a second picture at a second picture size, wherein the second picture references the decoded reference picture; a scaling means for scaling the decoded reference picture from the first picture size to the second picture size; a second encoding means for encoding the second picture in the bitstream at the second picture size based on the decoded reference picture at the second picture size; a size indication means for indicating the first picture size in a first PPS associated with the first picture and the second picture size in a second PPS associated with the second picture; and a second storing means for storing the bitstream for communication toward a decoder.

Optionally, in any of the preceding aspects, another implementation of the aspect provides, wherein the encoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
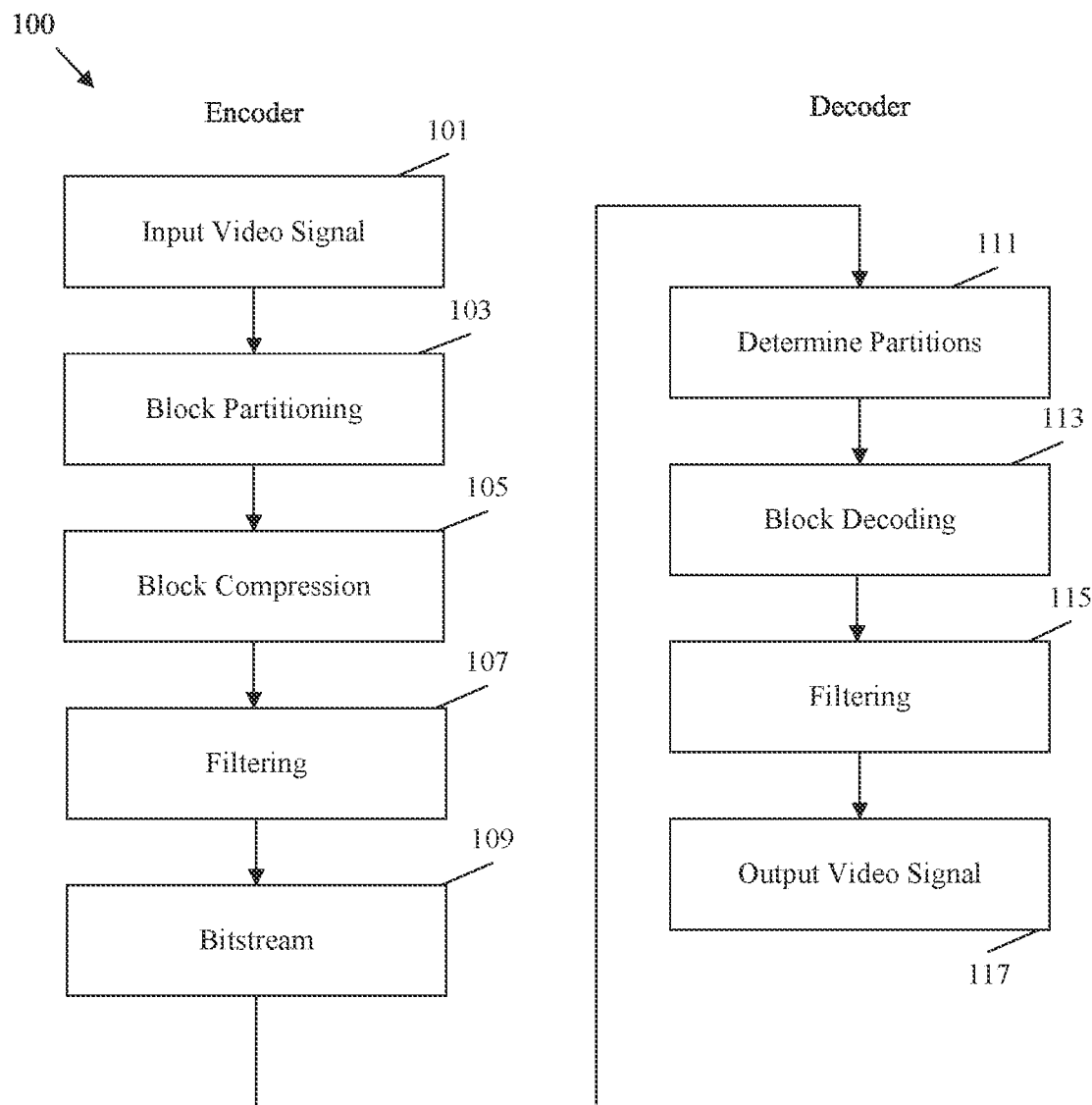
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Various acronyms are employed herein, such as coding tree block (CTB), coding tree unit (CTU), coding unit (CU), coded video sequence (CVS), Joint Video Experts Team (JVET), motion constrained tile set (MCTS), maximum transfer unit (MTU), network abstraction layer (NAL), picture order count (POC), raw byte sequence payload (RBSP), sequence parameter set (SPS), versatile video coding (VVC), and working draft (WD).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-L1001-v7.

Many video coding systems, such as HEVC and VVC, employ intra random access point (IRAP) pictures. An IRAP picture is generated according to intra-prediction. An IRAP picture may provide various functionalities/benefits. First, the presence of an IRAP picture indicates that the decoding process can start from that picture. This functionality allows a random access feature. Specifically, the decoding process can start at any position in a bitstream that contains an IRAP picture, and is hence not limited to decoding from the beginning of the bitstream. Second, the presence of an IRAP picture may refresh the decoding process such that coded pictures starting the IRAP picture are coded without any reference to previous pictures, with the exception of Random Access Skipped Leading (RASL) pictures. Accordingly, an IRAP picture in a bitstream prevents any multi-picture decoding error from propagating to pictures that follow the IRAP picture in decoding order. Instantaneous Decoder Refresh (IDR), broken link access (BLA), and/or Clean Random Access (CRA) pictures are example types of IRAP pictures in HEVC and/or VVC.

While IRAP pictures provide beneficial functionality, IRAP pictures may also create a penalty to compression efficiency. First, an IRAP picture is coded according to intra-prediction, which is employs more bits to encode similar content than inter-prediction. Second, the presence of an IRAP picture breaks temporal prediction, which results in refreshing the decoding process and removing previous reference pictures from the decoded picture buffer (DPB). By removing such reference pictures from the DPB, inter-prediction pictures following an IRAP picture in decoding order have access to fewer reference pictures, which reduces available coding options, and hence may result in a less efficient coding. Accordingly, the presence of an IRAP picture may cause a surge in bit-rate for a bitstream.

Among the picture types that are considered IRAP picture, IDR pictures in HEVC may be derived and/or signaled in a manner that is different from other IRAP picture types. Some of the differences are as follows. For example, when performing signaling and derivation of a picture order count (POC) value of an IDR picture, the most significant bit (MSB) portion of the POC may not be derived from a previous key picture and may instead be set equal to zero. Further, a slice header of an IDR picture may not contain information sufficient to assist in reference picture management. For other picture types (e.g., CRA, trailing pictures, Temporal Sublayer Access (TSA), etc.) information such as a reference picture set (RPS) and/or reference picture lists is employed to support a reference picture marking process. Reference picture marking involves determining the status of reference pictures in the DPB as either used for reference and/or not used for reference. However, for IDR picture, such information may not be signaled because the presence of an IDR indicates that the decoding process should mark all reference pictures in the DPB as unused for reference.

IRAP pictures may also be associated with leading pictures. Leading pictures are pictures that follow an IRAP picture in decoding order, but precede the IRAP picture in output (e.g., display) order. Leading pictures may include random access skipped leading (RASL) pictures and random access decodable leading (RADL) pictures. A RASL picture is a leading picture that is coded with reference to one or more pictures that precede the IRAP picture in decoding order. A RASL picture may not be decoded correctly when a decoding process starts at an associated IRAP picture because the picture(s) that precede the IRAP picture are not decoded. Hence, the reference information is not available to decode the RASL picture. A RADL picture is a leading picture that is coded without referencing directly or indirectly any pictures that precede the IRAP picture in decoding order. Because the RADL picture does not reference any picture preceding the IRAP picture, a RADL picture can be decoded when the decoding process starts at an associated IRAP picture. When one or more RASL and one or more RADL pictures are associated with the same IRAP picture, the RASL pictures should precede the RADL pictures in output order. IRAP pictures are also associated with trailing pictures. Trailing pictures are pictures that follow a first IRAP picture in output order and decoding order and precede any other IRAP picture in both output order and decoding order. IRAP pictures and leading pictures may be assigned different NAL unit types so that such pictures can be easily identified by system level applications. For example, a video splicer may understand coded picture NAL unit types without having to parse detailed syntax information in a coded bitstream. This allows a video splicer to easily distinguish between IRAP pictures, RASL picture, RADL pictures, and trailing pictures.

For example, in HEVC, IRAP pictures related pictures employ the following NAL unit types. A Broken Link Access (BLA) picture with a NAL type of BLA with leading picture (BLA_W_LP) is a BLA picture that may be followed by one or more leading pictures in decoding order. A BLA picture with a NAL type of BLA with RADL (BLA_W_RADL) is a BLA picture that may be followed by one or more RADL pictures, but no RASL picture in decoding order. A BLA picture with a NAL type of BLA with no leading picture (BLA_N_LP) is a BLA picture that is not followed by leading picture in decoding order. An IDR picture with a NAL type of IDR with RADL (IDR_W_RADL) is an IDR picture that may be followed by one or more RADL pictures but no RASL picture in decoding order. An IDR picture with a NAL type of IDR with no leading picture (IDR_N_LP) is an IDR picture that is not followed by leading picture in decoding order. A Clean Random Access (CRA) picture has a NAL type of CRA and may be followed by leading pictures (e.g., RASL pictures, RADL pictures, or both). A RADL picture has a NAL unit type of RADL and a RASL picture has a NAL unit type of RASL.

Adaptive resolution change (ARC) is a mechanism for dynamically changing picture resolution between pictures while the bitstream containing such pictures is in a state of transmission as part of an active communication session. ARC may be used for many applications. For example, ARC may be employed to support rate adaption in video telephony and conferencing. Specifically, ARC may be employed to adapt a coded video based on changing network conditions. When network conditions deteriorate (e.g., available bandwidth is reduced) the encoder may adapt to the bitstream by encoding smaller resolution pictures. ARC may be employed to support a display change due to a change in active speaker in multi-party video conferencing. For example, the current active speaker may be displayed via a bigger video size than the video for the rest of conference participants. When the active speaker changes, picture resolution for each participant may be adjusted accordingly. ARC may be more beneficial when such change in active speakers occurs frequently. ARC may be employed to support fast start mechanisms in streaming. Streaming applications may buffer a certain length of decoded pictures before initiating display of the video content. Initializing the bitstream with a smaller resolution may allow the application to fill the buffer more quickly to support a faster display start. ARC can then be employed to increase resolution once the video stream is fully buffered. ARC may also be employed to support adaptive stream switching in dynamic adaptive streaming over hypertext transfer protocol (DASH). For example, DASH includes a feature, denoted as @mediaStreamStructureId, that supports switching between different representations at open-group of pictures (GOP) random access points with non-decodable leading pictures (e.g., CRA pictures with associated RASL pictures). The @mediaStreamStructureId mechanism may be employed when two different representations of the same video have different bitrates but the same spatial resolution. The @mediaStreamStructureId mechanism supports switching between the two representations at a CRA picture with associated RASL pictures. In such a case, the RASL pictures associated with the switching CRA pictures can be decoded with acceptable quality, which results in seamless switching. With ARC, the @mediaStreamStructureId mechanism may be extended to support switching between DASH representations with different spatial resolutions.

There are certain deficiencies with the ARC mechanism as described above. In many video coding schemes, picture resolution changes can only occur at an IRAP picture. This has several issues. An IRAP picture coded at reasonable quality includes significantly more data than an inter-coded picture (e.g., intra-coded pictures have significantly less coding efficiency that inter-coded pictures). An IRAP picture is hence more complex to decode than an inter-predicted picture from a processor, memory, and network communication resource standpoint. Accordingly, when a resolution change is requested by a decoder due to loading problems at a current resolution, an IRAP picture is introduced which places further strain on the decoder. The IRAP picture can also break low-latency buffer conditions, force an audio re-synchronization, and temporarily increase the end-to-end delay of the stream. As such, ARC can introduce extra complexity when complexity avoidance is desired, which can result in a poor user experience. Further, ARC may support multiple resolutions, which should be efficiently signaled toward the decoder. In addition, ARC may cause a picture with a second resolution to refer to a reference picture of a first resolution in a decoded picture buffer. In such a case, the reference picture should be re-scaled from the first resolution to a second resolution. Consequently, multiple versions of a reference picture may be stored in the decoded picture buffer, which is inefficient. Also, a picture may not be displayed immediately after decoding is complete. Instead, the picture may be stored in the decoded picture buffer until the codec is ready to display the picture according to the output picture order. Video coding standards do not specify how to address a scenario where a picture changes resolution between the time that the picture is decoded and stored in the decoded picture buffer and the time the picture is displayed.

Disclosed herein are various mechanisms to support improved ARC. For example, the disclosed mechanisms allow for a resolution change between inter-coded pictures. Accordingly, the disclosed mechanisms do not need to switch resolutions at an IRAP picture. This avoids the inefficiencies associated with transmitting an extra IRAP picture, such as decoding an extra intra-coded picture, breaking inter-prediction, resetting the picture buffer, etc. The disclosed mechanisms operate by decoding and storing a first picture in the decoded picture buffer at a first resolution. The first resolution is indicated by a first picture parameter set (PPS) associated with the first picture. A second encoded picture is received that references the first picture in the decoded picture buffer. A second PPS associated with the second picture is also received. The second PPS indicates the second picture should be decoded at a second resolution that is different from the first resolution. This change between resolutions indicates an ARC. Upon determining the second picture references the first picture and determining a resolution change has occurred, the first picture is rescaled to the second resolution. This allows the second picture to be correctly decoded at the second resolution without transmitting an IRAP picture to reset inter-prediction chains between pictures. Accordingly, the disclosed mechanisms reduce the amount of network communication resources, processor resources, and memory resources used to perform a resolution change while the bitstream is in an active transmission state. If the first picture has not already been output, then the first picture can also be output at the second resolution. This allows the decoded picture buffer to maintain a single version of the rescaled picture. This approach reduces complexity as well, and also reduces the memory resource usage at the decoder.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
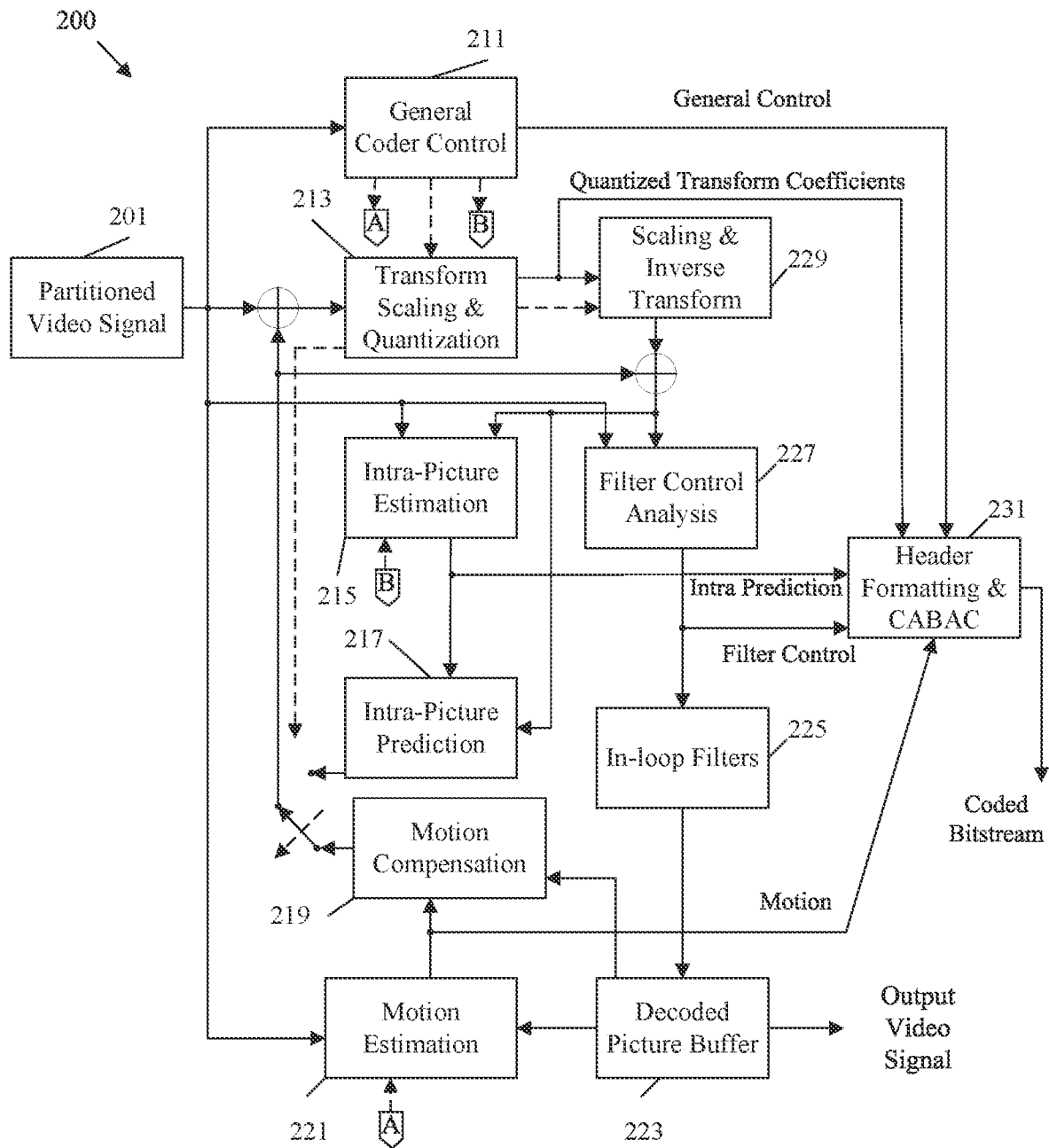
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bitrate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bitrate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
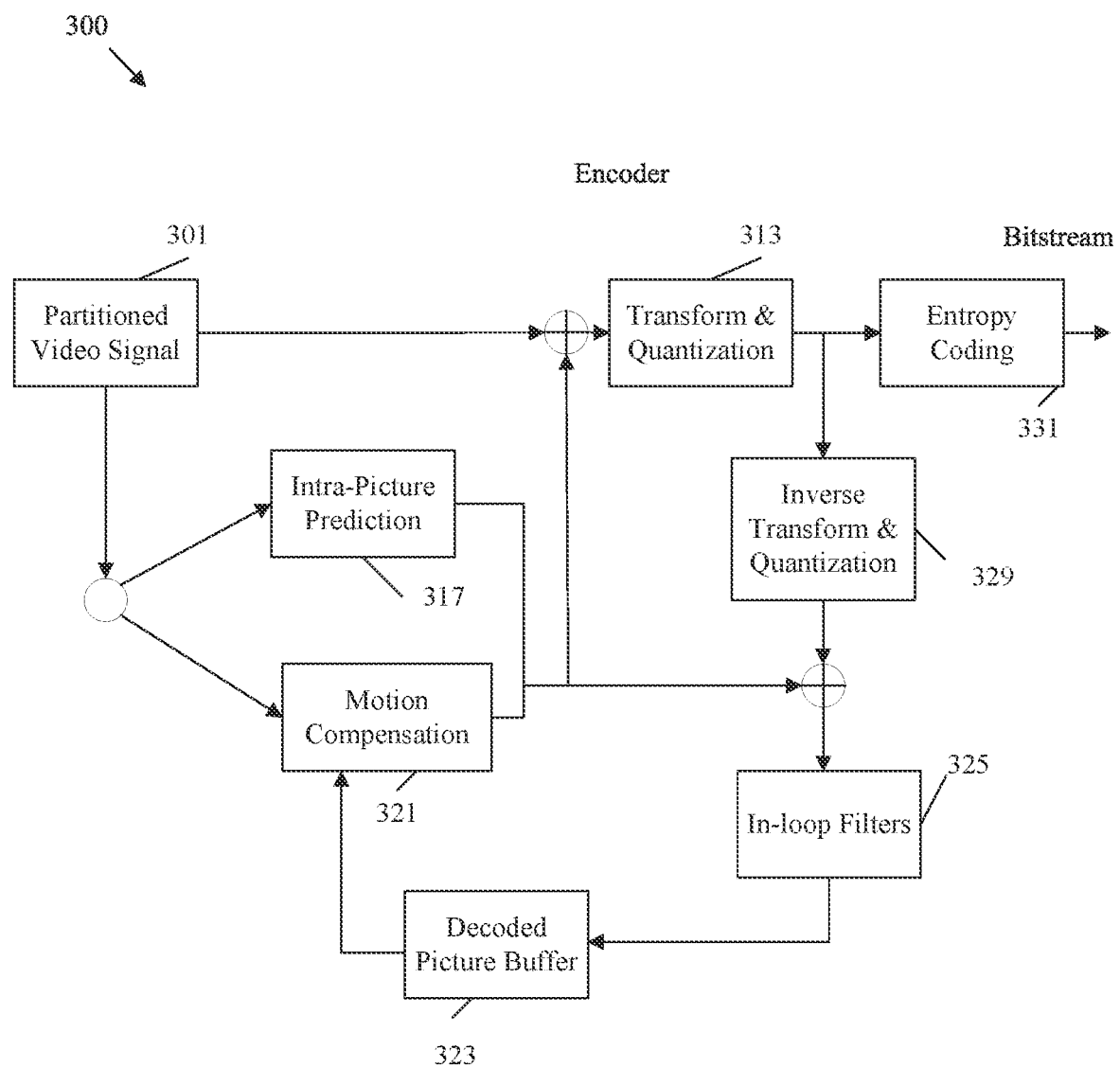
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
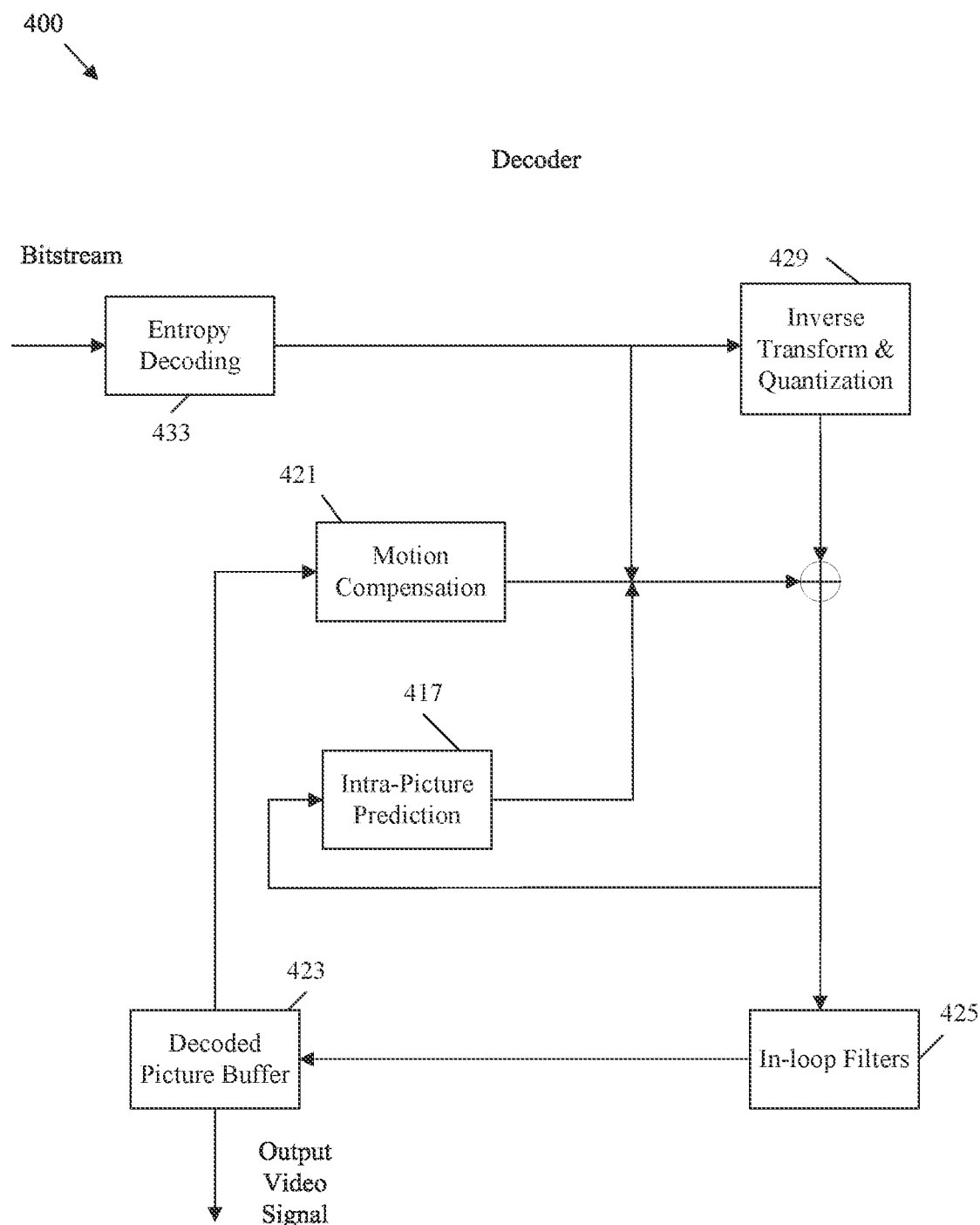
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
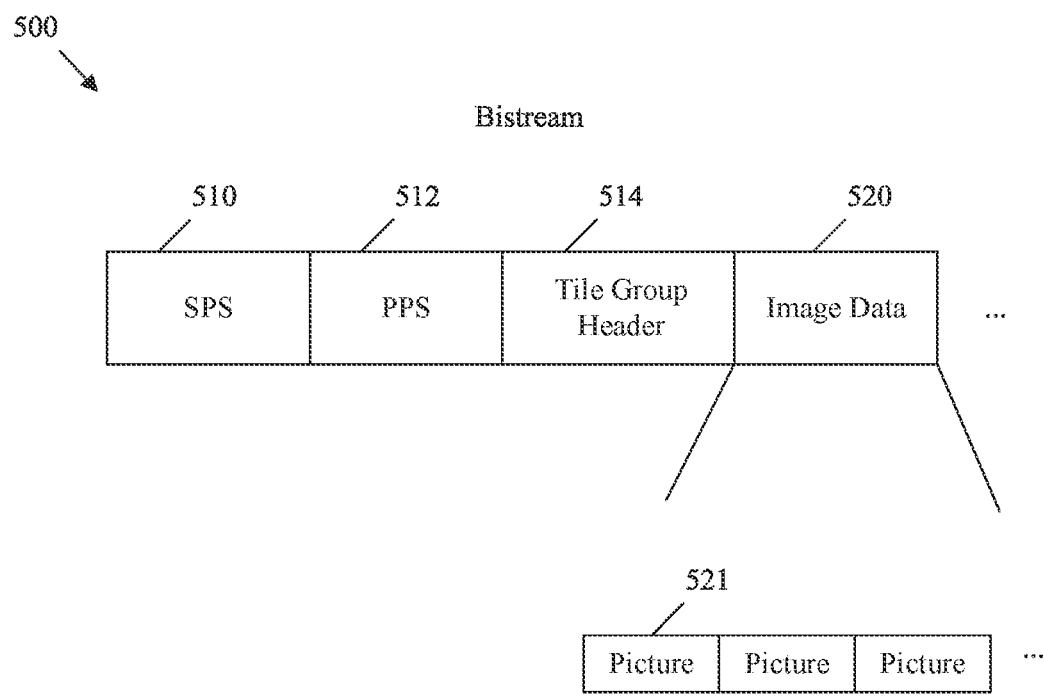
FIG. 5 is a schematic diagram illustrating an example bitstream containing an encoded video sequence.

FIG. 5 is a schematic diagram illustrating an example bitstream 500 containing an encoded video sequence. For example, the bitstream 500 can be generated by a codec system 200 and/or an encoder 300 for decoding by a codec system 200 and/or a decoder 400. As another example, the bitstream 500 may be generated by an encoder at step 109 of method 100 for use by a decoder at step 111.

The bitstream 500 includes a sequence parameter set (SPS) 510, a plurality of picture parameter sets (PPSs) 512, one or more tile group headers 514, and image data 520. An SPS 510 contains sequence data common to all the pictures in the video sequence contained in the bitstream 500. Such data can include picture sizing, bit depth, coding tool parameters, bitrate restrictions, etc. The PPS 512 contains parameters that are specific to one or more corresponding pictures. Hence, each picture in a video sequence may refer to one PPS 512. The PPS 512 can indicate coding tools available for tiles in corresponding pictures, quantization parameters, offsets, picture specific coding tool parameters (e.g., filter controls), etc. The tile group header 514 contains parameters that are specific to each tile group in a picture. Hence, there may be one tile group header 514 per tile group in the video sequence. The tile group header 514 may contain tile group information, picture order counts (POCs), reference picture lists, prediction weights, tile entry points, deblocking parameters, etc. It should be noted that some systems refer to the tile group header 514 as a slice header, and use such information to support slices instead of tile groups. In some cases, the terms tile group and tile group header 514 may be used interchangeably with the term slice and slice header.

The image data 520 contains video data encoded according to inter-prediction and/or intra-prediction as well as corresponding transformed and quantized residual data. Such image data 520 is sorted according to the partitioning used to partition the image prior to encoding. For example, the image data 520 is partitioned into pictures 521. A picture 521 is a single image indicating the visual state of a video sequence at a specified instant. A plurality of pictures 521 are displayed in order as part of a video sequence to create a sense of movement. A picture 521 may also be referred to as an image and/or a frame. The picture 521 is further divided into tiles. The tiles are further divided into coding tree units (CTUs). Coding trees are applied to the CTUs to divide the CTUs into coding blocks. The coding blocks can then be encoded/decoded according to intra-prediction and/or inter-prediction mechanisms. Accordingly, the pictures 521 are encoded into the bitstream 500 at the encoder. The coding mechanisms used to encode the pictures 521 are described in the SPS 510, PPSs 512, and tile group headers 514. The decoder can receive the bitstream 500. The decoder can then decode the pictures 521 based on the data in the SPS 510, PPSs 512, and tile group headers 514. The decoder can also place the pictures 521 into a video sequence for display.

Figure 6:
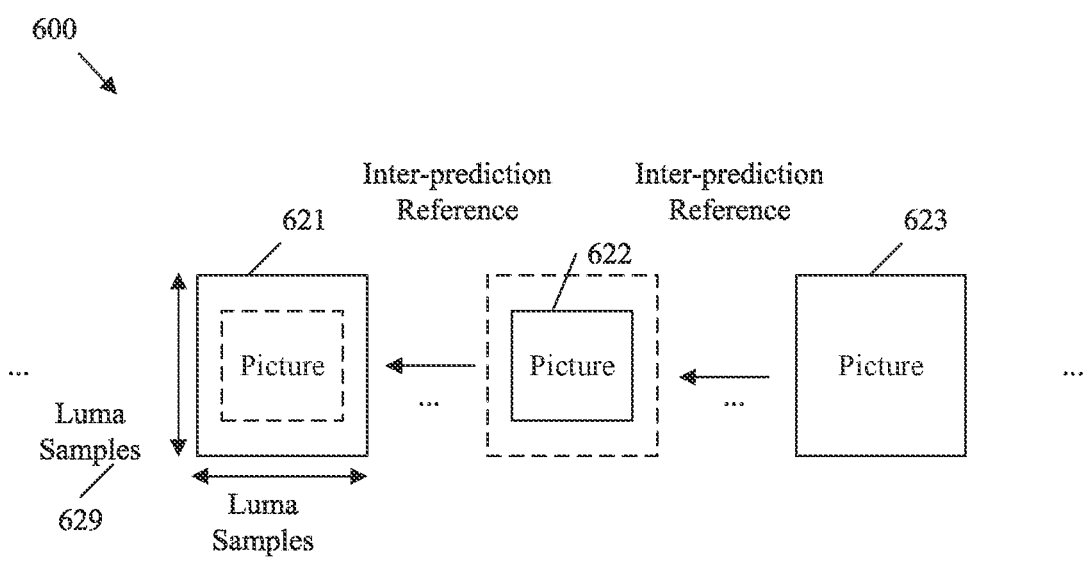
FIG. 6 is a schematic diagram illustrating an ARC mechanism.

FIG. 6 is a schematic diagram illustrating an ARC mechanism 600. For example, the ARC mechanism 600 may be applied to change resolutions of pictures in a bitstream 500 by a codec system 200, an encoder 300, and/or a decoder 400. As another example, the ARC mechanism 600 may be applied by an encoder and a decoder to change resolutions of segments of a bitstream during execution of method 100.

The ARC mechanism 600 may be applied to pictures 621, 622, and 623, which may be substantially similar to pictures 521. Pictures 621, 622, and 623 may each contain luma samples 629 containing light values and chroma samples containing color values. The size, and hence resolution, of a picture 621, 622, and/or 623 may be described in terms of the number of luma samples 629 in the corresponding picture. For example, picture 621 and 623 contain more luma samples 629 than picture 622, and hence pictures 621 and 623 are at a higher resolution than picture 622. In the example shown, picture 622 is encoded according to inter-prediction and is encoded by reference to picture 621. A picture 622 references a picture 621 when at least one coding block of picture 622 is encoded according to a motion vector that points to a corresponding coding block of picture 621. Also, picture 623 is encoded according to inter-prediction and is encoded by reference to picture 622.

The ARC mechanism 600 allows for changes in resolution, and hence changes in the number of luma samples 629, between pictures 621, 622 and 623 without needing to introduce an IRAP picture. While IRAP pictures may still be employed, for example to support random access, IRAP pictures are not needed to support resolution changes. In the example shown, the picture 621 is received and decoded at a first resolution. The resolution may be indicated by a first PPS, such as PPS 512. The picture 621 is then stored in a decoded picture buffer. The picture 622 is then received by the decoder. A second PPS indicates that the picture 622 should be decoded at a second resolution. In the example shown, the second resolution has fewer luma samples 629, and is hence smaller than the first resolution. The difference in resolutions indicates a resolution change. Accordingly, the picture 621 is scaled to the second resolution used for picture 622. Picture 621 is depicted at the larger first resolution in solid lines and at the smaller second resolution in dashed lines. As shown, this is accomplished without an IRAP picture between pictures 621 and 622. Once picture 621 is rescaled, picture 621 and 622 are the same resolution, and hence picture 622 can be decoded by reference to picture 621. In one example embodiment, the rescaled picture 621 may be stored in a temporary buffer apart of the unscaled picture 621 in order to ensure picture 621 is presented at the first resolution. In another example embodiment, a single copy of the scaled picture 621 is maintained in the decoded picture buffer. Accordingly, the picture 621 may be displayed at the first resolution prior to scaling or the second resolution after scaling, depending on when the display order determines to send the picture 621 toward a rendering device for display.

In the example shown, the resolution changes again between picture 622 and 623. While resolution changes may not usually occur at a high frequency as is implied by FIG. 6, the example is presented to illustrate that ARC mechanism 600 supports increases and decreases in resolution. In any case, picture 623 is received by the decoder at some later time. A third PPS indicates that the picture 623 should be decoded at a third resolution that is different from the second resolution. In the example shown, the third resolution has more luma samples 629, and is hence larger than the second resolution. The difference in resolutions indicates a resolution change. Accordingly, the picture 622 is scaled to the larger third resolution used for picture 623. Picture 622 is depicted at the second resolution in solid lines and at the third resolution in dashed lines. As shown, this is accomplished without an IRAP picture between pictures 622 and 623. Once picture 622 is rescaled, picture 622 and 623 are the same resolution, and hence picture 623 can be decoded by reference to picture 622. In one example embodiment, the rescaled picture 622 may be stored in a temporary buffer apart of the unscaled picture 622 in order to ensure picture 622 is presented at the second resolution. In another example, a single copy of the scaled picture 622 is maintained in the decoded picture buffer. Accordingly, the picture 622 may be displayed at the second resolution prior to scaling or the third resolution after scaling, depending on when the display order determines to send the picture 622 toward a rendering device for display. The decoded picture 623 can also be displayed, and coding can continue until the video sequence is complete or until another resolution change is desired.

It should be noted that the ARC mechanism 600 is described from the decoder perspective for clarity of discussion. However, the ARC mechanism 600 is also employed by the encoder. For example, the encoder determines to change resolutions between pictures 621, 622, and 623, for example based on requests from the decoder and/or changes in network conditions, encodes the pictures 621, 622, and 623 at the selected resolutions, and indicates the selected resolutions in the corresponding PPSs. Also, the encoder may decode the encoded pictures 621, 622, and/or 623 after encoding to generate reference pictures for encoding subsequent pictures. As such, the encoder may also perform decoding steps that are similar to the decoding steps performed by the decoder.

The following includes additional information relevant to video coding systems. A bitstream may be stored according to a standardized file format. File format standards include the International Organization for Standardization base media file format (ISOBMFF), as described in ISO/IEC 14496-12, and other file format standards derived from ISOBMFF, including MPEG-4 file (e.g., ISO/IEC 14496-14), 3rd Generation Partnership Project (3GPP) file format (e.g., 3GPP technical specification (TS) 26.244), and AVC file format (e.g., ISO/IEC 14496-15). Other mechanisms extend the ISOBMFF for specific applications, such as the carriage of NAL unit structured video in the ISOBMFF (e.g., ISO/IEC 14496-15). H.264/AVC and HEVC, as well as their extensions, are examples of NAL unit structured video.

ISOBMFF may be employed for many codec encapsulation formats, such as the AVC File Format, multimedia container formats (e.g., MPEG-4 File Format), the 3GPP File Format (3GP), and the Digital Video Broadcasting (DVB) file format. In addition to continuous media, such as audio and video, static media, such as images, as well as metadata, can be stored in a file conforming to ISOBMFF. Files structured according to ISOBMFF may be used for many purposes, including local media file playback, progressive downloading of a remote file, segments for Dynamic Adaptive Streaming over HTTP (DASH), containers for content to be streamed and corresponding packetization instructions, and recording of received real-time media streams. Thus, ISOBMFF may be employed for streaming mechanisms such as progressive download and/or DASH. For example, movie fragments defined in ISOBMFF can be used for streaming. In addition to continuous media (e.g., as audio and video), static media (e.g., such as images) as well as metadata can be stored in a file conforming to ISOBMFF.

A file conforming to the HEVC file format may employ a series of objects called boxes. A box may be an object-oriented building block defined by a unique type identifier and length. A box is the elementary syntax structure in ISOBMFF and may include a four-character coded box type, a byte count of the box, and a payload. In some examples, all data in a file conforming to the HEVC file format may be contained within boxes and there may be no data in the file that is not in a box. Thus, an ISOBMFF file may include a sequence of boxes, and boxes may contain other boxes. For example, the payload of a box may include one or more additional boxes.

A file conforming to ISOBMFF may include various types of boxes. For example, a file conforming to ISOBMFF may include a file type box, a media data box, a movie box, a movie fragment box, and so on. For example, a file type box may include a file type and compatibility information. A media data box may contain samples (e.g., coded pictures). A Movie box ("moov") contains metadata for continuous media streams present in the file. Each of the continuous media streams may be represented in the file as a track. For instance, a movie box may contain metadata describing a movie (e.g., logical and timing relationships between samples, and also pointers to locations of samples). Movie boxes may include several types of sub-boxes. The sub-boxes in a movie box may include one or more track boxes. A track box may include information about an individual track of a movie. A track box may include a track header box that specifies overall information of a single track. In addition, a track box may include a media box that contains a media information box. The media information box may include a sample table box that contains data indexing media samples in the track. Information in the sample table box may be used to locate samples in time and, for each of the samples of the track, a type, size, container, and offset into that container of the sample. Thus, the metadata for a track is enclosed in a Track box ("trak"), while the media content of a track is either enclosed in a Media Data box ("mdat") or directly in a separate file. The media content for tracks includes a sequence of samples, such as audio or video access units.

For example, ISOBMFF specifies a media track, which contains an elementary media stream, a hint track, which either includes media transmission instructions or represents a received packet stream, and a timed metadata track, which comprises time-synchronized metadata. The metadata for each track includes a list of sample description entries, each providing the coding or encapsulation format used in the track and the initialization data used for processing that format. Each sample may be associated with one of the sample description entries of the track.

ISOBMFF enables specifying sample-specific metadata with various mechanisms. The Sample Table box ("stbl") contains a sample table that contains all the time and data indexing of the media samples in a track. The tables in the Sample Table box may be employed to locate samples in time, determine sample type (e.g., I-frame or not), determine sample size, determine a container for the sample, and determine an offset associated with that container.

A movie fragment box is a top-level box. A movie fragment box may contain one or more track fragment ("traf") boxes. Zero or more track fragments may be included within the movie fragment. The track fragments may contain zero or more track runs, each of which documents a contiguous run of samples for the corresponding track. For instance, each track run may contain samples of pictures that are contiguous in a specified order, such as decoding order. A track fragment box comprises metadata for one or more track fragments. For instance, a track fragment box may include a track fragment header box indicating a track identifier (ID), a base data offset, a sample description index, a default sample duration, a default sample size, and default sample flags. A track fragment box may include one or more track fragment run boxes, each documenting a contiguous list of samples for a track. For instance, a track fragment box may include syntax elements indicating a sample count, a data offset, sample flags, a sample duration, a sample size, sample composition time offset, and so on. Within these structures, many fields are optional and can be set to default values.

The ISOBMFF supports stream access points (SAPs). A SAP enables random access into a container of a media stream. A container may contain more than one media stream. Each media stream is an encoded version of continuous media of certain media type. A SAP is a position in a container enabling playback of an identified media stream. The SAP position allows playback to be initiated using only the information contained in the container starting from that position onwards, and initialization data, if applicable, which may be externally available and/or obtained from other part(s) of the container. Derived specifications should specify if initialization data is employed to access the container at a SAP, and how the initialization data can be accessed.

Six types of SAP may employed. Type 1 SAP corresponds to a closed GOP random access point, in which all access units starting from SAP in decoding order can be correctly decoded. This results in a continuous time sequence of correctly decoded access units with no gaps. Further, the first access unit in decoding order is also the first access unit in composition order. Type 2 SAP corresponds to a closed GOP random access point, in which the first access unit in decoding order in the media stream is not the first access unit in composition order. Type 3 SAP corresponds to an open GOP random access point, in which there are some access units in decoding order following the random access point that cannot be correctly decoded. Further, the random access point access unit may not be the first access unit in composition order. Type 4 SAP corresponds to a gradual decoding refresh (GDR) starting point. Type 5 SAP corresponds to the case for which there is at least one access unit in decoding order starting from first access unit that cannot be correctly decoded. Further, such access unit has a presentation time greater than TDEC, where TDEC is the earliest presentation time of any access unit starting from the first access unit for decoding. Type 6 SAP corresponds to the case for which there is at least one access unit in decoding order starting from first access unit that cannot be correctly decoded. Further, such access unit has a presentation time greater than TDEC, where TDEC is not the earliest presentation time of any access unit starting from the first access unit for decoding.

DASH, as specified in ISO/IEC 23009-1, is an example adaptive streaming application that may employ the mechanisms described herein. DASH specifies the format of a media presentation description (MPD), also known as a manifest, and specifies a media segment format. The MPD describes the media available on the server so that the DASH client can autonomously select and download media versions as desired while dynamically adapting to changing network conditions. DASH is based on a hierarchical data model. A presentation is described by an MPD document. The MPD describes a sequence of periods in time that make up the media presentation. A period may represent a media content period during which a consistent list of encoded versions of the media content is available. For example, a list of available bitrates, languages, captions, subtitles, etc. may not change during a period.

Within a period, material is arranged into adaptation sets. An adaptation set represents a list of interchangeable encoded versions of one or more media content components. For example, one adaptation set may include the main video component and a separate adaptation set may include the main audio component. Other available material, such as captions or audio descriptions, may each be included in a separate adaptation set. Material may also be provided in multiplexed form, in which case interchangeable versions of the multiplex may be described as a single adaptation set. For example, an adaptation set may be multiplexed to contain both the main audio and main video for a period. Each of the multiplexed components may be described individually by a media content component description.

An adaptation set contains a list of representations. A representation describes a deliverable encoded version of one or several media content components. A representation includes one or more media streams (e.g., one for each media content component in the multiplex). Any single representation within an adaptation set is sufficient to render the contained media content components. By collecting different representations in one adaptation set, the MPD indicates that the representations represent perceptually equivalent content. Accordingly, clients may switch dynamically from representation to representation within an adaptation set in order to adapt to network conditions or other factors. Switching refers to the presentation of decoded data up to a certain time t, and presentation of decoded data of another representation from time t onwards. If representations are included in one adaptation set, and the client switches properly, the media presentation is expected to be perceived seamlessly across the switch. Clients may ignore representations that rely on codecs or other rendering technologies they do not support or that are otherwise unsuitable. Within a representation, the content may be divided in time into segments for proper accessibility and delivery. In order to access a segment, a universal resource locator (URL) is provided for each segment. Consequently, a segment is the largest unit of data that can be retrieved with a single HTTP request.

An example procedure for DASH may include the following steps. A client first obtains the MPD of a streaming content, such as a movie. The MPD includes information describing different alternative representations, such as bitrate, video resolution, and frame rate, audio language of the streaming content as well as the URLs of the indicated HTTP resources (e.g., the initialization segment and the media segments). Based on information in the MPD and the client's local information, the client may request the desired representation(s), one segment (or a part thereof) at a time. Such client local information may include network bandwidth, decoding/display capabilities, and user preference. When the client detects a network bandwidth change, the client may request segments of a different representation with a better-matching bitrate. This switch may occur at a random access point for the segment. During an HTTP streaming session a user may request to seek backward to a past position or forward to a future position in the media presentation. The client can accomplish this by requesting past or future segments starting from the random access point of the segment that is closest to the desired position. The user may also request to fast-forward the content, which may be realized by requesting sufficient data for decoding only the intra-coded video pictures or only a temporal sublist of the video stream.

As noted above, DASH and other video coding systems may rely on random access points, and hence IRAP pictures, when changing video content resolutions. The present disclosure improves these technologies by providing mechanisms to support adaptive resolution change in video coding without relying on IRAP pictures to act as random access points. Accordingly, the disclosed mechanisms allow picture resolution changes within a stream or coded sequence without having to introduce an IRAP picture.

The present disclosure includes the following example embodiments to implement resolution changes without IRAP pictures. In a first example, a list of possible picture resolutions can be signaled in the bitstream. In another example, the list of possible picture resolutions can be included in parameter sets of the coded video sequence, where the parameter sets are referred to directly or indirectly by a picture. A number of picture sizes can be signaled. In an example, at least one picture size signaled by default. Accordingly, instead of signaling the number of picture sizes, the number of picture sizes minus one may be signaled, which results in a bit-saving of one. A list of picture sizes may be signaled in terms of picture width and height in luma samples. The number of picture sizes and the list of picture resolutions may be signaled in a parameter set that persists for at least a coded video sequence. Such parameter set can be the SPS. For further signaling efficiency improvement, the list of picture sizes (e.g., widths and heights) may be signaled as follows. The first entry can be signaled as absolute values, while each of the other entries can be signaled as a delta width and a delta height relative to the width and height of the previous entry. A picture size index can also be signaled in a parameter set that is directly referred to by pictures, such as a PPS. A picture size index is an index to the list of picture sizes that is signaled in the SPS. The picture size of a picture is the picture width and height that are in the list of picture sizes signaled in the SPS with the index pointed to by the picture size index. The picture size index may be signaled by a syntax element called picture_size_idx, for example. The presence of picture_size_idx can further be a condition based on the number of picture sizes in the list of picture sizes in SPS. When there is only one picture size in the list, picture_size_idx may not be present and the value may be inferred to be equal to zero.

In a second example, the list of picture sizes may be signaled in the SPS as follows. The signaling may be performed based picture size, for example, based on the smallest picture size or the largest picture size of the coded video sequence. For example, the ratio of picture size change may be signaled. Such a ratio can specify a picture size change from a previous picture size. For example, a ratio of two indicates the current picture width is two times the previous picture width. Likewise, a picture height may be signaled as two times the previous picture height. For bit-savings, a technique of signaling with a _minus2 term can be used as the current picture size should be different from the previous picture size. A ratio of zero may not be allowed. The number of picture sizes may also be signaled. For example, at least one picture size may be signaled by default. Thus, the number of picture sizes minus one may be signaled for a bit-savings instead of signaling the number of picture sizes.

In a third example, information related to output size may be included in a parameter set that is directly or indirectly referred to by a picture. The output size may be used by the decoder to determine an output picture size. For example, the output size information can be signaled in the PPS. The picture output size may be constrained to be one of the picture sizes in the list of picture sizes signaled in SPS. Thus, picture output size information can be signaled using an index to the list of picture sizes signaled in the SPS. For example, picture output size may be signaled by a syntax element called picture_output_size_idx. The presence of picture_output_size_idx can further be conditioned based on the number of picture sizes in the list of picture sizes in SPS. The picture_output_size_idx may be omitted when the list contains only one picture size. In such a case, the value of picture_output_size_idx can be inferred to be equal to zero.

In a fourth example, a decoded picture can be stored in the DPB at the decoded picture's original picture size. The decoded picture can then be scaled when the decoded picture is referred to by a picture with a different size. The resulting scaled picture may be stored in a temporary buffer in some examples.

In a fifth example, a reference picture may be present in the DPB either in an original size or in a post scaling size (e.g., either up-scaled or down-scaled). Only one version of the reference picture may exist in the DPB. Hence, a separate version of the reference may not be maintained when the picture is scaled. For simplicity, a reference picture can be scaled from an original size only once. When a decoder prepares to output a picture in the DPB, the decoder should check if the size of the picture is different from the size for output. If the sizes are different, the decoder may scale the picture size to match the output size.

The following describes a particular example implementation of the disclosed mechanisms. A simple ARC operation may be performed as follows. The spatial resolution of a picture may differ from the nominal resolution of a previous picture by a factor 0.5 as applied to either or both dimensions. The spatial resolution change may increase or decrease, which yields scaling ratios of 0.5 and 2.0. The aspect ratios and chroma formats of the video format may not be changed. The cropping areas may be scaled in proportion to spatial resolution changes. The reference pictures may be re-scaled as desired, which allows inter-prediction to operate without modification. A 1:2 downscaling filter may be used. This filter may have zero phase and 5 taps (e.g., (−1, 9, 16, 9, −1)/32). The down-sampling points may be at even sample positions and may be co-sited. The same filter is used for luma and chroma. For 2:1 up-sampling, additional samples at odd grid positions may be generated using the half-pel motion compensation interpolation filter coefficients. The combined up- and down-sampling may not change phase or the position of chroma sampling points.

An example sequence parameter set RBSP syntax and semantics is as follows.

| | Descriptor |
| --- | --- |
| seq_parameter_set_rbsp( ) { | |
| ... | |
|   pic_width_in_luma_samples | ue(v) |
|   pic_height_in_luma_samples | ue(v) |
|   num_pic_size_in_luma_samples_minus1 | ue(v) |
|   for( i = 0; i <= num_pic_size_in_luma_ | |
|   samples_minus1; i++ ) { | |
|     pic_width_in_luma_samples[ i ] | ue(v) |
|     pic_height_in_luma_samples[ i ] | ue(v) |
|   } | |
| ... | |
| } | |

The numpic_size_in_luma_samples_minus1 plus 1 specifies the number of picture sizes (width and height) in units of luma samples that may be present in the coded video sequence. The pic_widthin_luma_samples[i] specifies the i-th width of decoded pictures in units of luma samples that may be present in the coded video sequence. The pic_width_in_luma_samples[i] shall not be equal to zero and shall be an integer multiple of MinCbSizeY. The pic_height_in_luma_samples[i] specifies the i-th height of decoded pictures in units of luma samples that may be present in the coded video sequence. The pic_height_in_luma_samples[i] shall not be equal to zero and shall be an integer multiple of MinCbSizeY.

An example picture parameter set RBSP syntax and semantics are as follows.

|  | Descriptor |
|---|---|
| pic_parameter_set_rbsp( ) { | |
| ... | |
| pic_size_idx | ue(v) |
| output_pic_size_idx | ue(v) |
| ... | |
| } | |

The pic_size_idx specifies the index of the i-th picture size in the sequence parameter set. The width of pictures that refer to the picture parameter set is pic_width_in_luma_samples[pic_size_idx] in luma samples. Likewise, the height of pictures that refer to the picture parameter set is pic_height_in_luma_samples[pic_size_idx] in luma samples. The output pic_size_idx specifies the picture size for output of a picture. The output size index refers to the picture size in the sequence parameter set. The output width of pictures that refer to the picture parameter set is pic_width_in_luma_samples[pic_size_idx] in luma samples. Likewise, the output height of pictures that refer to the picture parameter set is pic_height_in_luma_samples[pic_size_idx] in luma samples.

Figure 7:
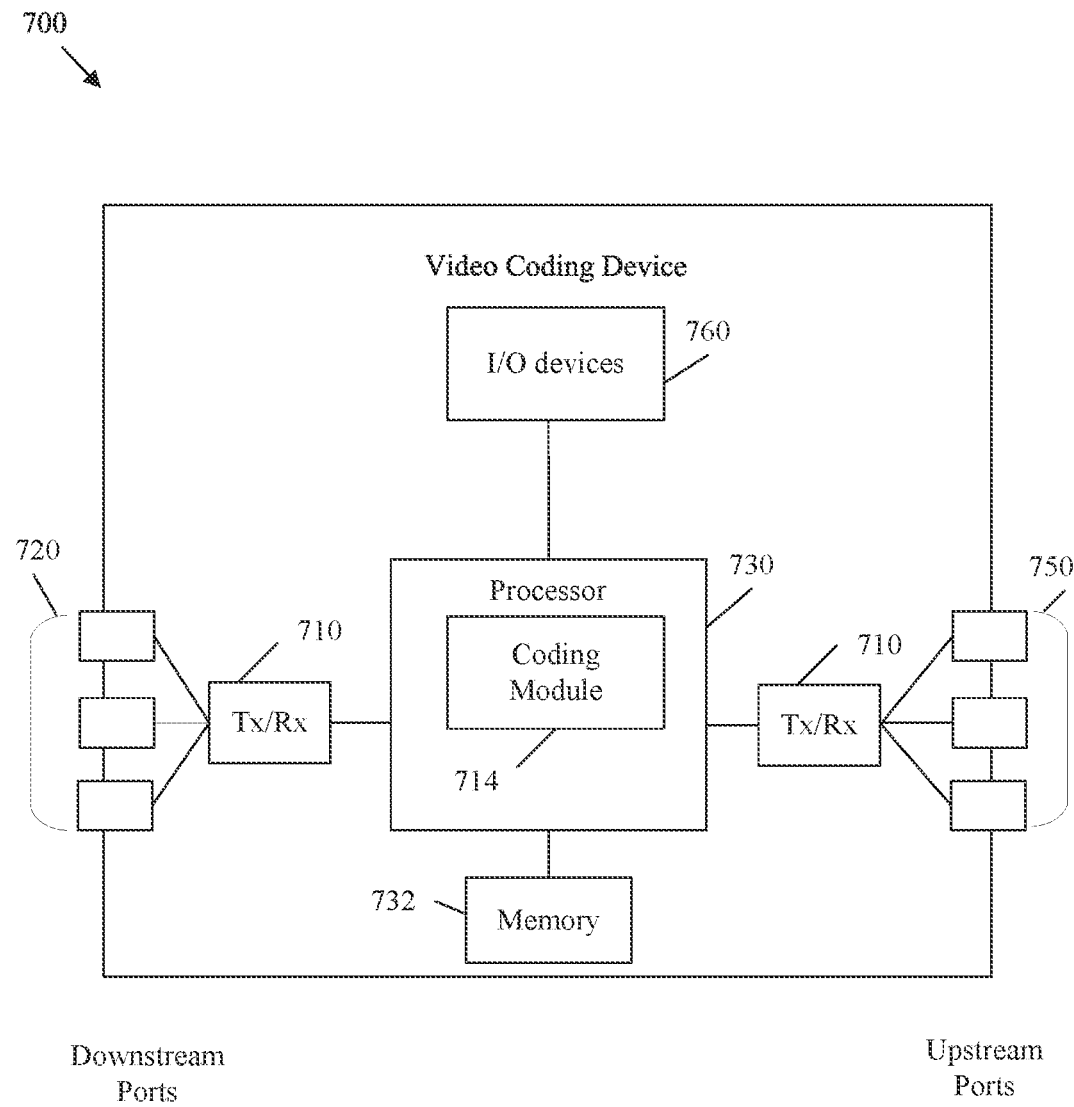
FIG. 7 is a schematic diagram of an example video coding device.

FIG. 7 is a schematic diagram of an example video coding device 700. The video coding device 700 is suitable for implementing the disclosed examples/embodiments as described herein. The video coding device 700 comprises downstream ports 720, upstream ports 750, and/or transceiver units (Tx/Rx) 710, including transmitters and/or receivers for communicating data upstream and/or downstream over a network. The video coding device 700 also includes a processor 730 including a logic unit and/or central processing unit (CPU) to process the data and a memory 732 for storing the data. The video coding device 700 may also comprise electrical, optical-to-electrical (OE) components, electrical-to-optical (EO) components, and/or wireless communication components coupled to the upstream ports 750 and/or downstream ports 720 for communication of data via electrical, optical, or wireless communication networks. The video coding device 700 may also include input and/or output (I/O) devices 760 for communicating data to and from a user. The I/O devices 760 may include output devices such as a display for displaying video data, speakers for outputting audio data, etc. The I/O devices 760 may also include input devices, such as a keyboard, mouse, trackball, etc., and/or corresponding interfaces for interacting with such output devices.

The processor 730 is implemented by hardware and software. The processor 730 may be implemented as one or more CPU chips, cores (e.g., as a multi-core processor), field-programmable gate arrays (FPGAs), application specific integrated circuits (ASICs), and digital signal processors (DSPs). The processor 730 is in communication with the downstream ports 720, Tx/Rx 710, upstream ports 750, and memory 732. The processor 730 comprises a coding module 714. The coding module 714 implements the disclosed embodiments described herein, such as methods 100, 800, and 900, which may employ a bitstream 500 and/or ARC mechanism 600. The coding module 714 may also implement any other method/mechanism described herein. Further, the coding module 714 may implement a codec system 200, an encoder 300, and/or a decoder 400. For example, when acting as an encoder, the coding module 714 can indicate a resolution size of a first picture in a first PPS. The coding module 714 can determine to change the resolution size of the pictures in the bitstream, for example based on a request from the decoder. The coding module 714 can then determine to encode a second picture into the bitstream at a second size, and can indicate the second size in the second PPS. The coding module 714 can then rescale the first picture to the second size in the DPB and encode the second picture based on the first picture via inter-prediction. When acting as a decoder, the coding module 714 can determine a change in resolution by reading the first PPS and the second PPS. The coding module 714 can then rescale the first picture in the DPB and decode the second picture at the second size based on the first picture at the second size. As such, the coding module 714 improves the functionality of the video coding device 700 as well as addresses problems that are specific to the video coding arts by allowing for resolution changes in a bitstream without introducing an IRAP picture. Further, the coding module 714 effects a transformation of the video coding device 700 to a different state. Alternatively, the coding module 714 can be implemented as instructions stored in the memory 732 and executed by the processor 730 (e.g., as a computer program product stored on a non-transitory medium).

The memory 732 comprises one or more memory types such as disks, tape drives, solid-state drives, read only memory (ROM), random access memory (RAM), flash memory, ternary content-addressable memory (TCAM), static random-access memory (SRAM), etc. The memory 732 may be used as an over-flow data storage device, to store programs when such programs are selected for execution, and to store instructions and data that are read during program execution.

Figure 8:
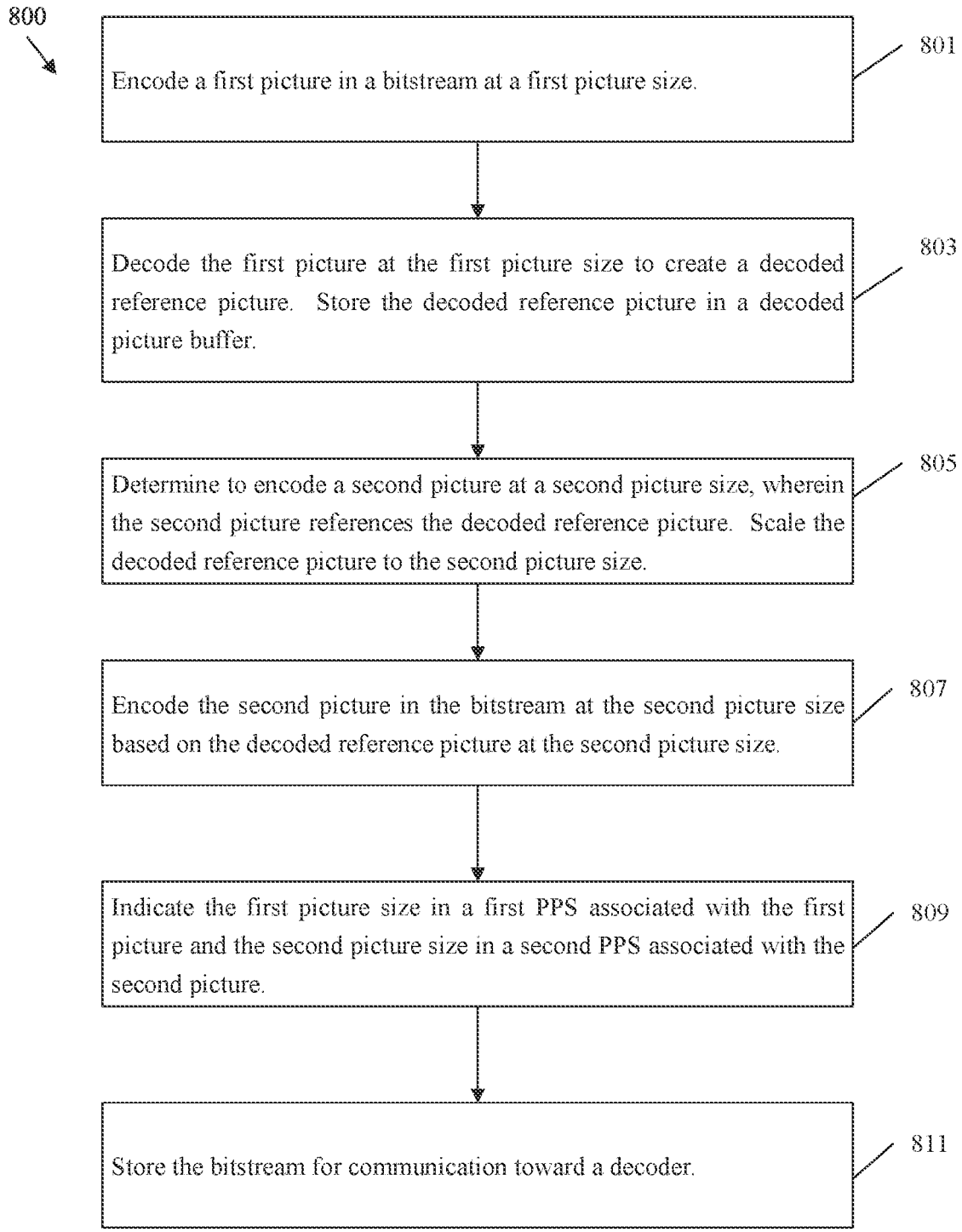
FIG. 8 is a flowchart of an example method of encoding a bitstream via ARC.

FIG. 8 is a flowchart of an example method 800 of encoding a bitstream, such as bitstream 500, via ARC, for example by employing ARC mechanism 600. Method 800 may be employed by an encoder, such as a codec system 200, an encoder 300, and/or a video coding device 700 when performing method 100.

Method 800 may begin when an encoder receives a video sequence including a plurality of images and determines to encode that video sequence into a bitstream, for example based on user input. At step 801, a first picture is encoded in a bitstream at a first picture size. At step 803, the first picture is decoded at the first picture size to create a decoded reference picture. The decoded reference picture can then be stored in a decoded picture buffer. The decoded reference picture may be stored in the decoded picture buffer to allow later pictures to be encoded based on the decoded reference picture according to inter-prediction. For example, coding blocks of a later picture can be encoded by reference to coding blocks of the first picture by employing motion vectors.

At step 805, the encoder can determine to encode a second picture at a second picture size. For example, the encoder may receive a request from a decoder indicating that network conditions have changed and a different picture resolution (e.g., higher or lower) would result in a better user experience. The encoder determines to encode the second picture according to inter-prediction. Specifically, the encoder determines to encode the second picture by reference to the decoded reference picture. In this context, a reference to the decoded reference picture indicates that at least one coding block of the second picture is coded by reference to a coding block of the decoded reference picture (e.g., by employing a motion vector according to inter-prediction mechanisms). The first picture size is different from the second picture size. As such, the encoder determines that the second picture size is different from the first picture size, and hence a resolution change has occurred. Accordingly, the encoder scales the decoded reference picture to the second picture size. In some examples, the decoded reference picture is not scaled until the decoded reference picture is referenced by the second picture. In some examples, the decoded reference picture can be stored in a temporary buffer after scaling, for example to support maintaining multiple resolutions. In other examples, the memory maintains a single version of the decoded reference picture despite scaling.

At step 807, the second picture is encoded into the bitstream at the second picture size based on the decoded reference picture at the second picture size. The first picture and the second picture may not be separated in the bitstream by an IRAP picture. Accordingly, the scaling and encoding based on the scaled decoded reference picture supports improved ARC mechanisms with increased coding efficiency.

At step 809, the encoder indicates the first picture size in a first PPS associated with the first picture and the second picture size in a second PPS associated with the second picture. For example, the first picture size and the second picture size may be indicated in the bitstream (in the PPS) in units of luma samples. At step 811, the bitstream is stored for communication toward a decoder. The bitstream can further be streamed toward the decoder as desired.

Figure 9:
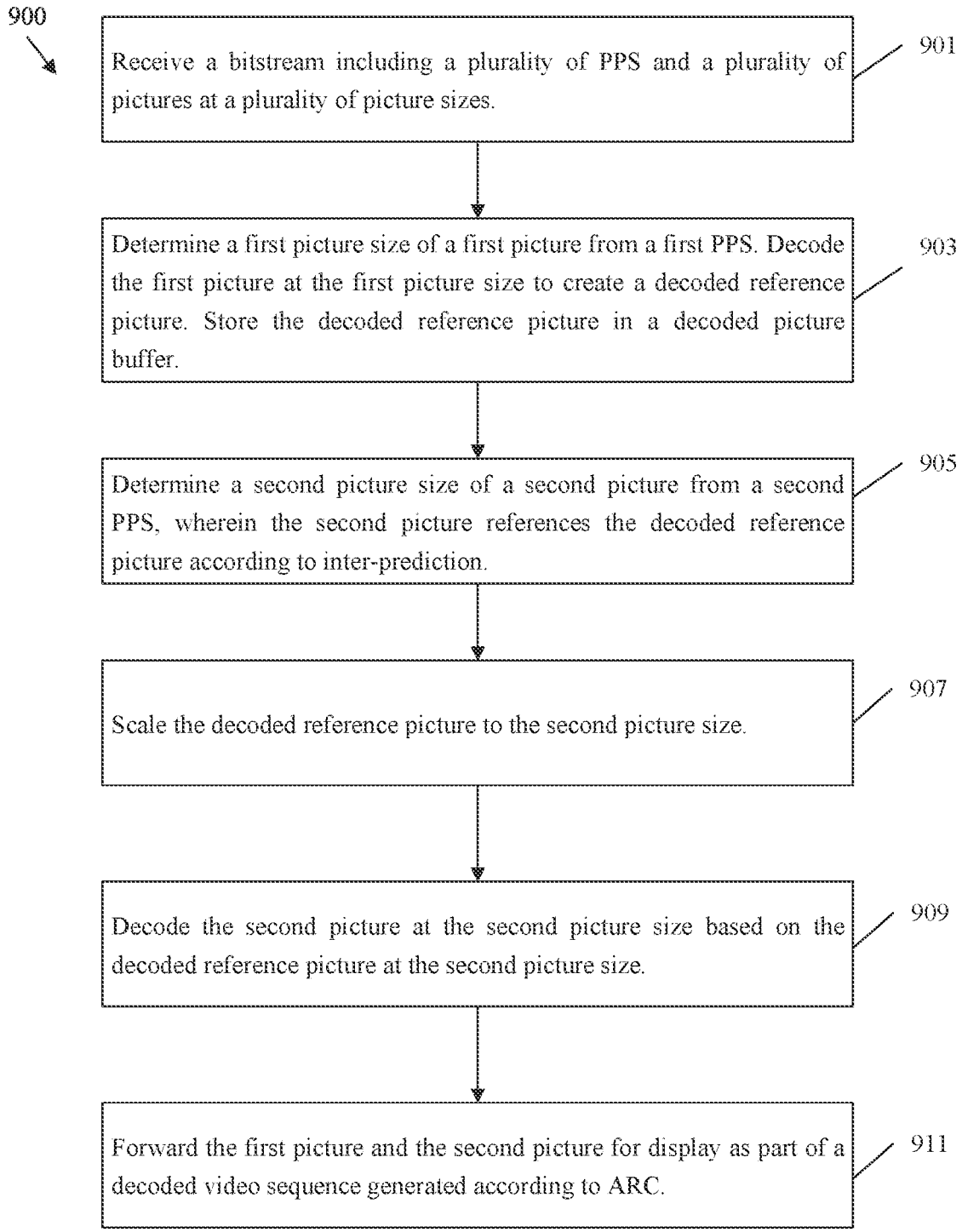
FIG. 9 is a flowchart of an example method of decoding a bitstream via ARC.

FIG. 9 is a flowchart of an example method 900 of decoding a bitstream, such as bitstream 500, via ARC, for example by employing ARC mechanism 600. Method 900 may be employed by a decoder, such as a codec system 200, a decoder 400, and/or a video coding device 700 when performing method 100.

Method 900 may begin when a decoder begins receiving a bitstream of coded data representing a video sequence, for example as a result of method 800. At step 901, a bitstream is received at a decoder. The bitstream includes a plurality of PPSs and a plurality of pictures at a plurality of picture sizes. At step 903, the decoder determines a first picture size of a first picture from a first PPS. The decoder decodes the first picture at the first picture size to create a decoded reference picture. The decoded reference picture is also stored in a decoded picture buffer.

At step 905, the decoder determines a second picture size of a second picture from a second PPS. The second picture is coded by reference to the decoded reference picture according to inter-prediction. In this context, a reference to the decoded reference picture indicates that at least one coding block of the second picture is coded by reference to a coding block of the decoded reference picture (e.g., by employing a motion vector according to inter-prediction mechanisms). The first picture size and the second picture size may be indicated in the bitstream (in the PPS) in units of luma samples.

The first picture size is different from the second picture size. As such, the decoder determines that the second picture size is different from the first picture size, and hence a resolution change has occurred. Accordingly, the decoder scales the decoded reference picture to the second picture size at step 907. In some examples, the decoded reference picture is not scaled until the decoded reference picture is referenced by the second picture. In some examples, the decoded reference picture can be stored in a temporary buffer after scaling, for example to support maintaining multiple resolutions. In other examples, the memory maintains a single version of the decoded reference picture despite scaling.

At step 909, the second picture is decoded at the second picture size based on the decoded reference picture at the second picture size. The first picture and the second picture may not be separated in the bitstream by an IRAP picture. Accordingly, the scaling and decoding based on the scaled decoded reference picture supports improved ARC mechanisms with increased coding efficiency. At step 911, the first picture and the second picture are forwarded toward a display device for display to a user as part of a decoded video sequence generated according to ARC.

Figure 10:
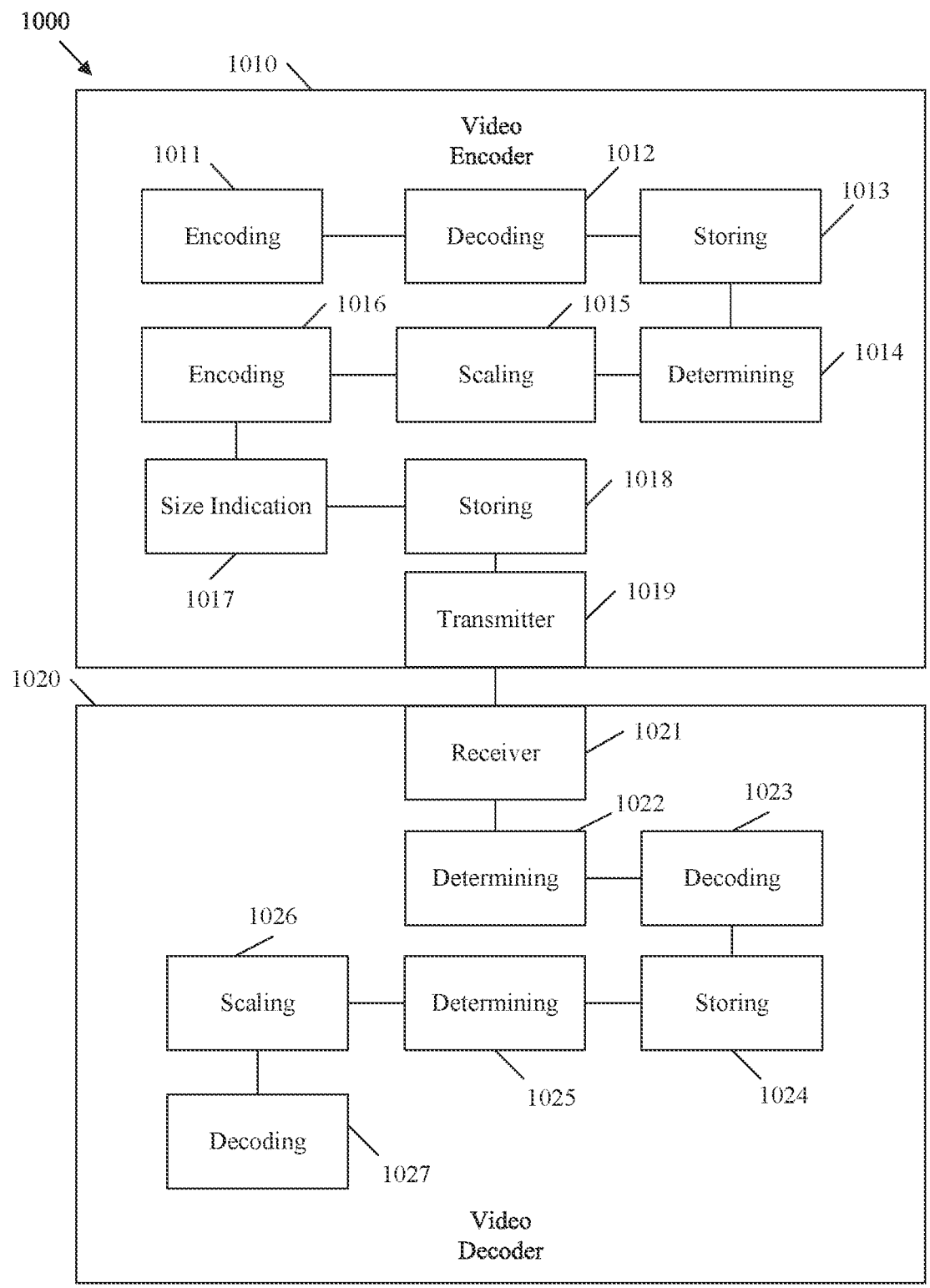
FIG. 10 is a schematic diagram of an example system for coding a video sequence in a bitstream via ARC.

FIG. 10 is a schematic diagram of an example system 1000 for coding a video sequence, in a bitstream, such as bitstream 500 via ARC, for example by employing ARC mechanism 600. System 1000 may be implemented by an encoder and a decoder such as a codec system 200, an encoder 300, a decoder 400, and/or a video coding device 700. Further, system 1000 may be employed when implementing method 100, 800, and/or 900.

The system 1000 includes a video encoder 1010. The video encoder 1010 comprises a first encoding module 1011 for encoding a first picture in a bitstream at a first picture size. The video encoder 1010 further comprises a decoding module 1012 for decoding the first picture at the first picture size to create a decoded reference picture. The video encoder 1010 further comprises a first storing module 1013 for storing the decoded reference picture in a decoded picture buffer. The video encoder 1010 further comprises a determining module 1014 for determining to encode a second picture at a second picture size, wherein the second picture references the decoded reference picture. The video encoder 1010 further comprises a scaling module 1015 for scaling the decoded reference picture to the second picture size. The video encoder 1010 further comprises a second encoding module 1016 for encoding the second picture in the bitstream at the second picture size based on the decoded reference picture at the second picture size. The video encoder 1010 further comprises a size indication module 1017 for indicating the first picture size in a first PPS associated with the first picture and the second picture size in a second PPS associated with the second picture. The video encoder 1010 further comprises a second storing module 1018 for storing the bitstream for communication toward a decoder. The video encoder 1010 further comprises a transmitting module 1019 for transmitting the bitstream toward the decoder. The video encoder 1010 may be further configured to perform any of the steps of method 800.

The system 1000 also includes a video decoder 1020. The video decoder 1020 comprises a receiving module 1021 for receiving a bitstream including a plurality of PPSs and a plurality of pictures at a plurality of picture sizes. The video decoder 1020 further comprises a first determining module 1022 for determining a first picture size of a first picture from a first PPS. The video decoder 1020 further comprises a first decoding module 1023 for decoding the first picture at the first picture size to create a decoded reference picture. The video decoder 1020 further comprises a storing module 1024 for storing the decoded reference picture in a decoded picture buffer. The video decoder 1020 further comprises a second determining module 1025 for determining a second picture size of a second picture from a second PPS, wherein the second picture references the decoded reference picture according to inter-prediction. The video decoder 1020 further comprises a scaling module 1026 for scaling the decoded reference picture to the second picture size. The video decoder 1020 further comprises a second decoding module 1027 for decoding the second picture at the second picture size based on the decoded reference picture at the second picture size. The video decoder 1020 may be further configured to perform any of the steps of method 900.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented in a decoder, the method comprising:
    receiving, by a receiver of the decoder, a bitstream including a plurality of picture parameter sets (PPSs) and a plurality of pictures at a plurality of picture sizes;
    determining, by a processor of the decoder, a first picture size of a first picture from a first PPS, wherein the first PPS includes a first index referencing the first picture size in at least one sequence parameter set (SPS);
    decoding, by the processor, the first picture at the first picture size to create a decoded reference picture;
    storing, by a memory of the decoder, the decoded reference picture in a decoded picture buffer;
    determining, by the processor, a second picture size of a second picture from a second PPS, wherein the second picture references the decoded reference picture according to inter-prediction, wherein the second PPS includes a second index referencing the second picture size in the at least one SPS;
    scaling, by the processor, the decoded reference picture from the first picture size to the second picture size; and
    decoding, by the processor, the second picture at the second picture size based on the decoded reference picture at the second picture size.

2. The method of claim 1, wherein the first picture and the second picture are not separated in the bitstream by an intra random access point (TRAP) picture.

3. The method of claim 1, wherein the decoded reference picture is not scaled until the decoded reference picture is referenced by the second picture.

4. The method of claim 1, wherein the decoded reference picture is stored in a temporary buffer after scaling.

5. The method of claim 1, further comprising forwarding, by the processor, the first picture and the second picture for display as part of a decoded video sequence.

6. The method of claim 1, wherein the memory maintains a single version of the decoded reference picture despite scaling.

7. The method of claim 1, wherein the first picture size and the second picture size are indicated in the bitstream in units of luma samples.

8. A method implemented in an encoder, the method comprising:
    encoding, by a processor of the encoder, a first picture in a bitstream at a first picture size;
    decoding, by the processor, the first picture at the first picture size to create a decoded reference picture;
    storing, by a memory of the encoder, the decoded reference picture in a decoded picture buffer;
    determining, by the processor, to encode a second picture at a second picture size, wherein the second picture references the decoded reference picture;
    scaling, by the processor, the decoded reference picture from the first picture size to the second picture size;
    encoding, by the processor, the second picture in the bitstream at the second picture size based on the decoded reference picture at the second picture size;
    indicating the first picture size in a first picture parameter set (PPS) associated with the first picture and the second picture size in a second PPS associated with the second picture, wherein the first PPS includes a first index referencing the first picture size in at least one sequence parameter set (SPS), and wherein the second PPS includes a second index referencing the second picture size in the at least one SPS; and
    storing, in the memory, the bitstream for communication toward a decoder.

9. The method of claim 8, wherein the first picture and the second picture are not separated in the bitstream by an intra random access point (TRAP) picture.

10. The method of claim 8, wherein the decoded reference picture is not scaled until the decoded reference picture is referenced by the second picture.

11. The method of claim 8, wherein the decoded reference picture is stored in a temporary buffer after scaling.

12. The method of claim 8, wherein the memory maintains a single version of the decoded reference picture despite scaling.

13. The method of claim 8, wherein the first picture size and the second picture size are indicated in the bitstream in units of luma samples.

14. A video coding device comprising:
a receiver configured to receive a bitstream including a plurality of picture parameter sets (PPSs) and a plurality of pictures at a plurality of picture sizes; and
a processor configured to:
determine a first picture size of a first picture from a first PPS, wherein the first PPS includes a first index referencing the first picture size in at least one sequence parameter set (SPS);
decode the first picture at the first picture size to create a decoded reference picture;
store the decoded reference picture in a decoded picture buffer in a memory;
determine a second picture size of a second picture from a second PPS, wherein the second picture references the decoded reference picture according to inter-prediction;
scale the decoded reference picture from the first picture size to the second picture size; and
decode the second picture at the second picture size based on the decoded reference picture at the second picture size, wherein the second PPS includes a second index referencing the second picture size in the at least one SPS.

15. The video coding device of claim 14, wherein the first picture and the second picture are not separated in the bitstream by an intra random access point (TRAP) picture.

16. The video coding device of claim 14, wherein the decoded reference picture is not scaled until the decoded reference picture is referenced by the second picture.

17. The video coding device of claim 14, wherein the decoded reference picture is stored in a temporary buffer after scaling.

* * * * *

UNITED STATES PATENT AND TRADEMARK OFFICE
CERTIFICATE OF CORRECTION

| | | |
|---|---|---|
| PATENT NO. | : 11,652,985 B2 | Page 1 of 1 |
| APPLICATION NO. | : 17/360960 | |
| DATED | : May 16, 2023 | |
| INVENTOR(S) | : Fnu Hendry et al. | |

It is certified that error appears in the above-identified patent and that said Letters Patent is hereby corrected as shown below:

In the Claims

Column 32, Lines 8-10, Claim 2, should read:
2. The method of claim 1, wherein the first picture and the second picture are not separated in the bitstream by an intra random access point (IRAP) picture.

Column 34, Lines 8-10, Claim 15, should read:
15. The video coding device of claim 14, wherein the first picture and the second picture are not separated in the bitstream by an intra random access point (IRAP) picture.

Signed and Sealed this
Twenty-seventh Day of June, 2023

Katherine Kelly Vidal
*Director of the United States Patent and Trademark Office*